United States Patent Office 2,951,024
Patented Aug. 30, 1960

2,951,024

IRRADIATED POLYMERS

Gaetano F. D'Alelio, South Bend, Ind., assignor, by mesne assignments, to BarDal, Inc., Rockford, Ill., a corporation of Delaware No Drawing. Filed Mar. 22, 1957, Ser. No. 647,744

11 Claims. (Cl. 204—158)

This invention relates to the irradiation of polymeric materials.

More specifically, it relates to the treatment of compositions comprising linear, aliphatic, saturated polyesters by irradiation and the improvements effected in the physical and chemical properties of such compositions by such treatment.

In the past there have been certain limitations in the properties of saturated polyesters resins. In order to have solubility and low melting characteristics desirable for application of such resins for many purposes such as coatings or shaped articles, it has been necessary to sacrifice somewhat the solvent resistance and high melting point or heat resistance desired in finished articles made from these resins. Attempts have been made to effect improvements in such desired properties by incorporating in the resins substitutents having unsaturation of a nature which might cause crosslinkages by post-treatment after application or shaping of the resin. However, difficulty in controlling the amount and the timing of such crosslinking and increased tendency of such materials to discolor have left much to be desired in that practice.

The properties of polyethylene have been improved by irradiation, apparently by the formation of crosslinkages between polyethylene molecules. However, the polymer molecules in polyethylene consists of carbon-carbon bonds which are relatively stable. Therefore the bombardment required to form crosslinkages in saturated molecules of this type might be expected to cause little damage in the way of side reactions which decompose or breakdown the carbon-to-carbon or polymer chain. With polymers containing a multiplicity of ester groups, however, it was feared the bombardment effected in irradiation might be concentrated on the more polar ester linkages in the polymer chain. Therefore with the amount of bombardment required to effect crosslinkages, it was expected that there would be a deterioration of the polyester polymer molecules so as to result in an undesirable reduction in molecular weight. It was also expected that the presence of polar groups might have an adverse effect with respect to the formation of crosslinkages.

Surprisingly and in accordance with the present invention, it has been found, however, that linear, aliphatic, saturated polyesters can be irradiated to give products having improved properties, such as greater solvent and heat resistance than the original polymer had. Furthermore these irradiated products can be hydrolyzed or saponified to give materials or monomeric units different from whose of which the polyester resins were orginally constituted.

The term "irradiation," as used herein, means high energy radiation and/or the secondary energies resulting from conversion of this electron energy to neutron or gamma radiation, said electron energies being at least about 100,000 electron volts. As used herein, the term "linear" refers to soluble and/or fusible polymers which are not substantially crosslinked between polymer molecules but which can have branched chains in the polymer molecules.

The linear, saturated, aliphatic polyesters used in the practice of this invention may advantageously be prepared from dihydroxy alkanes, such as ethylene glycol, and dicarboxylic aliphatic acids, such as succinic acid, or from aliphatic compounds containing an hydroxy and carboxylic acid group in the same molecule. While the dihydroxy and dicarboxylic compounds are advantageous in the preparation of linear polyesters, it is possible and very often desirable to use other polyhydric alkanes and other polycarboxylic aliphatic acids in quantities or under conditions which give polymers which are not substantially crosslinked. For example, glycerine can be used in such amounts or under conditions controlled so as to give very little or no crosslinking. Thus, succinic acid or anhydride can be reacted with less than the stoichiometric amount of ethylene glycol. Then, when the esterification reaction is substantially completed, glycerine can be added in such a calculated amount that only two hydroxy groups of the glycerine can enter the reaction to complete esterification with the free carboxylic acid groups in the reaction mixture. Furthermore, polyhydric and polycarboxylic aliphatic compounds of the type indicated can be partially esterified so that there are substantially only two hydroxy or carboxylic acid groups available to participate in the polymerization reaction. Thus, the monostearate of glycerine, or the dicaproate of pentaerythritol, or the monohexyl ester of tricarballylic acid can be used.

It has been noted that resins having molecular weights greater than about 6,000 can be easily converted to insoluble products in accordance with the practice of this invention. With polyesters resins of lower molecular weight, it is necessary to expose the resins to correspondingly greater amounts of irradiation to reach the insoluble stage. However, it is contemplated that irradiation treatment of such low molecular weight polyesters for other purposes as described hereinafter, for example as low as about 4,000, is within the scope of this invention, even though the irradiation is not carried on far enough to effect insolubility. For such low molecular weight polyester resins a considerable amount of the preliminary irradiation is apparently directed to increasing linear polymer chains, or in changing the type of polymer linkage. After the linear polymer length has reached a certain amount or type, the joining together of polymer chains apparently results in the crosslinking which effects insolubility. It is also possible that there is a certain amount of decomposition of ester linkages effected by the irradiation resulting in a reduction of molecular weights, which is competitive with the increase of molecular weights caused by tying polymer chains together by irradiation. However this invention is not considered as restricted to any such theories or explanations, and the scope of the invention is contemplated as herein described and claimed.

While any of methods known in the prior art can be used in the preparation of the polyesters used in the practice of this invention, the procedure illustrated in Example 1 has been found to be satisfactory. The parts and percentages recited therein and all through this specification, unless specifically provided otherwise, refer to parts by weight and percentages by weight. Moreover, the examples described in this specification are intended merely to illustrate the invention and not in any sense to limit the manner in which the invention can be practiced.

*Example 1*

A reactor vessel is equipped for the application of a vacuum or reduced pressure, external heating, temperature reading of the reaction mass, the feeding of a slow stream of inert gas through the reaction mass, and the escape of gases or vapors from the system. In this reactor is placed 202 parts of sebacic acid, or equivalent weight of other dibasic acid as indicated herein, and 68 parts of ethylene glycol, or equivalent weight of other dihydric material as indicated herein. The system is flushed with dry, oxygen-free nitrogen and a stream of nitrogen is bubbled slowly through the reaction mass continuously throughout the heating period. Heat is applied to bring the temperature of the reaction mass up to a temperature of 220° C. This temperature is maintained throughout the reaction period. After reaction at atmospheric pressure for four to six hours, the pressure in the reactor is reduced to approximately 0.2 mm. of mercury for a period of 5 to 20 or more hours, depending on the molecular weight desired in the polymer product.

By the above procedure polyesters were obtained from sebacic acid and ethylene glycol having a relative viscosity of 0.468 when the reaction had been carried out at 0.2 mm. Hg for 10 hours, and a relative viscosity of 0.691 for a corresponding 20 hours.

In the foregoing example and throughout this specification, relative viscosities have been determined in chloroform solutions containing 0.8 gram of resin in 100 cubic centimeters of solution. The relative viscosities have been calculated by the following formula:

$$\text{Relative viscosity} = \frac{V_{sp}}{V_o} - 1$$

wherein $V_{sp}$ is the viscosity of the solution and $V_o$ is the viscosity of the solvent.

As indicated above, irradiation or high energy radiation is used in the practice of this invention. While various types of irradiation are suitable for this purpose, such as X-ray and gamma and beta rays, the radiation produced by high power electron linear accelerators has been found to be very conveniently and economically applicable and to give very satisfactory results. However, regardless of the type of irradiation and the type of equipment used for its generation or application, the use thereof in the treatment of polyesters as described is contemplated as falling within the scope of this invention so long as it is produced by or from electron energy of at least about 100,000 electron volts. While there is no upper limit to the electron energy that can be so applied advantageously, the effects desired in the practice of this invention can be accomplished without having to go above 50,000,000 electron volts. Generally the higher the electron energy used the greater is the depth of penetration into massive structures of polyester and the shorter is the time of exposure required to accomplish the desired result. For other types of irradiation, such as gamma and X-rays, energy systems equivalent to the above range of electron volts are desirable.

Various types of high power electron linear accelerators are commercially available, for example from Applied Radiation Corporation, Walnut Creek, California. In the following Example II ARCO type travelling wave accelerator, model Mark I, operating at 3 to 10 million electron volts, was used to supply the irradiation. Other types of accelerators, such as supplied by High Voltage Engineering Corporation, Burlington, Massachusetts, or as described in United States Patent No. 2,763,609 and in British Patent No. 762,953 are satisfactory for the practice of this invention.

For exposure to irradiation the various resin compositions described herein can be in film or fiber form or as coatings and other shaped articles. When the composition is in liquid form, it can be exposed in any type of container that will not interfere with the electron stream; for example, aluminum tubes are satisfactory.

In the following examples, the radiation doses are reported in megareps, which represent 1,000,000 reps. A "rep" is defined, according to "Reactor Shielding Design Manual" edited by Theodore Rockwell III and published by D. Van Nostrand Company, Inc., 1st edition, 1956, as that radiation dosage which produces energy absorption in human tissue equal to 93 ergs per gram of tissue.

Example II

A polyester prepared from ethylene glycol and sebacic acid according to the procedure of Example I with a reduced pressure period of 20 hours, has a relative viscosity of 0.691 and is completely soluble in chloroform. When samples of this polyester are given different amounts of irradiation using a high power electron linear accelerator, the properties change as follows:

| Applied megareps: | Relative viscosity |
|---|---|
| 10 | 0.698. |
| 25 | 0.704. |
| 50 | Insoluble in $CHCl_3$ and infusible. |
| 100 | Insoluble in $CHCl_3$ and infusible. |

Another sample of this polyester when exposed to $1 \times 10^8$ roentgens of gamma radiation gives a product which is insoluble in chloroform and is infusible.

A similar sample when exposed to $1 \times 10^8$ roentgens of X-rays likewise gives a product which is insoluble in chloroform and is infusible.

Example III

Another polyester prepared from ethylene glycol and azelaic acid according to Example I, using a reduced pressure period of 10 hours, and having a relative viscosity of 0.458, when irradiated as in Example II, shows the following changes in properties:

| Applied megareps: | Relative viscosity |
|---|---|
| 10 | 0.490. |
| 50 | 0.518. |
| 100 | Insoluble in $CHCl_3$ and infusible. |

Example IV

A polyester, prepared from trimethylene glycol and sebacic acid according to the procedure of Example I with a reduced pressure period of 20 hours and having a relative viscosity of 0.439, when given independent irradiation treatments, as in Example II, of 5, 10, 25, 50 and 100 megareps respectively, becomes insoluble in chloroform and infusible in each case.

Example V

A polyester prepared from trimethylene glycol and adipic acid according to the procedure of Example I and using a reduced pressure period of 10 hours, has a relative viscosity of 0.256. When irradiated as in Example II the resin shows the following changes in properties:

| Applied megareps: | |
|---|---|
| 5 | 0.449 relative viscosity. |
| 25 | Insoluble in $CHCl_3$ and infusible. |
| 50 | Insoluble in $CHCl_3$ and infusible. |
| 100 | Insoluble in $CHCl_3$ and infusible. |

Similar results are also obtained when two samples of this same polyester are irradiated as in Example II except that 100,000 and 25,000,000 electron volts respectively are used.

Example VI

A polyester prepared from trimethylene glycol and succinic acid anhydride according to the procedure of Example I and using a reduced pressure period of 10 hours, is soluble in chloroform but when separate samples are irradiated as in Example II with 5, 10, 25, 50 and 100 megareps respectively, the resin in each case becomes infusible and insoluble in chloroform.

Example VII

A polyester prepared from tetramethylene glycol and sebacic acid according to the procedure of Example I and using a reduced pressure period of 20 hours, has a relative viscosity of 0.316. When irradiated as in Example II with 5, 10, 25, 50 and 100 megareps applied respectively to separate samples, the resin in each case becomes infusible and insoluble in chloroform.

Example VIII

A polyester prepared from tetramethylene glycol and adipic acid according to the procedure of Example I and using a reduced pressure period of 20 hours, has a relative viscosity of 0.389. When irradiated as in Example II with 5, 10, 25, 50 and 100 megareps applied respectively to separate samples, the resin in each case becomes infusible and insoluble in chloroform.

Example IX

A polyester is prepared from tetramethylene glycol and succinic acid anhydride according to the procedure of Example I and using a reduced pressure period of 10 hours; the relative viscosity is 0.279. When irradiated as in Example II with 5, 10, 25, 50 and 100 megareps applied respectively to separate samples, the resin in each case becomes infusible and insoluble in chloroform.

Example X

A polyester prepared from pentamethylene glycol and sebacic acid according to the procedure of Example I and using a reduced pressure period of 25 hours, is soluble in chloroform but when irradiated as in Example II with 5, 10, 50 and 100 megareps applied respectively to separate samples, the resin in each case becomes infusible and insoluble in chloroform.

Example XI

A polyester prepared from pentamethylene glycol and succinic acid anhydride according to the procedure of Example I and using no reduced pressure, has a relative viscosity of 0.219. When irradiated as in Example II, the resin shows the following changes in properties:

Applied megareps:
- 5 _____ 0.336 relative viscosity.
- 10 _____ Insoluble in $CHCl_3$ and infusible.
- 25 _____ Insoluble in $CHCl_3$ and infusible.
- 50 _____ Insoluble in $CHCl_3$ and infusible.
- 100 _____ Insoluble in $CHCl_3$ and infusible.

Example XII

A polyester prepared from 2,2-dimethylpropanediol-1,3 and equivalent parts of succinic acid anhydride and pimelic acid was prepared according to the procedure of Example I and using a reduced pressure period of 10 hours, is soluble in acetone. When irradiated as in Example II with 10, 25 and 100 megareps applied respectively to separate samples, the resin in each case becomes infusible and insoluble in acetone.

Example XIII

A polyester prepared from 3-methylpentanediol-1,4 with glutaric acid was prepared according to the procedure of Example I and using a reduced pressure period of 20 hours, is soluble in carbon tetrachloride. When irradiated as in Example II with 10, 25 and 100 megareps applied respectively to separate samples, the resin in each case becomes infusible and insoluble in carbon tetrachloride.

There are several ways in which branches can be introduced into the polymer molecules. As illustrated in some instances above, the glycol or the dibasic acid can already have a branch chain in its molecules as, for example, in 2,2-dimethylpropanediol-1,3; 2,2-diethylbutanediol-1,4; 4,5-dihydroxynonane; octylsuccinic acid; succinic acids produced by the hydrogenation of the condensation products of maleic anhydride with $C_{22}$ and similar olefins; etc. Moreover, branches in the polymer may be introduced by using polyhydric and polycarboxylic acids containing more than two hydroxy or acid groups in each molecule. The branches can then be introduced by reacting, for example by etherifying or esterifying, some or all such groups, either before or after polymerization, in excess of those actually required to make the linear polymer chain. Thus as shown in Examples XIV and XV glycerine can be used to replace some of the glycol used in Example II and glycerol monostearate can be used similarly to replace some or all of the glycol.

Example XIV

The procedure of Example I is repeated using 34 parts of ethylene glycol and 50 parts of glycerine in place of the amount of ethylene glycol used in Example I. The resultant polyester product is divided into two equal portions. The first portion is irradiated directly with 25 megareps as in Example II. The second portion is esterified with 70 parts of stearic acid according to Example I, using a reduced pressure period of 10 hours, and the resulting product is also irradiated with 25 megareps as in Example II. In both cases, the resins before irradiation are soluble in chloroform but after irradiation the products are insoluble and infusible.

Example XV

Two experiments are performed using the procedure of Example I. In one case half of the ethylene glycol is replaced by an equivalent amount of glyceryl monostearate and in the other case all of the ethylene glycol is replaced by a corresponding equivalent amount of glyceryl monostearate. In both cases the resins are fusible and soluble in chloroform before irradiation but are infusible and insoluble after irradiation with 25 megareps as in Example II.

Similar results are obtained in each case when the glyceryl monostearate is replaced by an equivalent weight of glyceryl monolaurate, glyceryl monomyristate, glyceryl monopalmitate, glyceryl monocaprylate and pentaerythrityl dicaprylate.

As indicated above polyesters useful in the practice of this invention can also be prepared from aliphatic compounds which contain at least one hydroxy and one carboxylic acid group in the same molecule. Where such compounds contain more than one hydroxy or more than one carboxylic acid group, care must be taken again to prevent a substantial amount of crosslinking.

Example XVI

One hundred eighty-eight parts of w-hydroxydecanoic acid is used in place of the ethylene glycol and sebacic acid of Example I and the procedure of that example used with a 10 hour reduced pressure period in preparing a polyester resin. The resultant resin is fusible and soluble in chloroform but upon irradiation with 25 megareps as in Example II, the resin becomes infusible and insoluble in chloroform.

For most purposes in the practice of this invention it is generally desirable to have in the polyester molecules a higher proportion of methylene —$CH_2$— groups or hydrocarbon portion than ester —COOR— groups. While most of the polyester examples shown above are of the more easily available hydroxy and carboxylic acid compounds having a relatively few number of carbon atoms between the esterifiable groups, there is no limitation on the number of carbon atoms which separate the esterifiable or esterified groups. This is determined by the properties desired in the resultant polyesters, the availability of the materials and the sluggishness of such high molecular weight materials to undergo esterification because of the higher proportion of non-esterifiable portions of such materials. Example XVII illustrates that higher molecular weight compounds can be used in the practice of this invention.

Example XVII

A polyester is prepared according to the procedure of Example I using tetradecamethylene glycol and succinic acid anhydride and a reduced pressure period of 20 hours. The resultant ester is fusible and soluble in chloroform but upon irradiation with 25 megareps in accordance with Example II it becomes infusible and insoluble in chloroform.

Similar results are obtained with polyesters produced from ethylene glycol and Japanic acid (nonadecane-1,19-dicarboxylic acid) and from decamethylene glycol and thapsic acid.

In addition to the hydroxy and carboxylic acid compounds mentioned in the preceding discussion and examples, various other compounds may be used in various combinations of two or more in the preparation of polyesters as indicated herein suitable for the practice of this invention, including but not limited to the following: heptamethylene glycol, nonamethylene glycol, decamethylene glycol, 2,2-dimethylpropanediol-1, 3, 3-methylpentanediol-1,4, 3-methylpentanediol-1,5, malonic acid, methyl malonic acid, methyl succinic acid, brassilic acid, glutaric acid, pimelic acid, suberic acid, etc. Other hydroxyaliphatic carboxylic acids which can also be used in addition to those already mentioned, either alone, in mixtures of two or more with each other, or in mixtures with glycols and polybasic acids to produce polyesters for the practice of this invention include, but are not restricted to hydracrylic acid, beta-hydroxyisobutyric acid, epsilon-hydroxycaproic acid, sabinic acid, juniperic acid and jalapinolic acid.

An important feature of this invention resides in the fact that the irradiated product can be hydrolysed or saponified to give various polyfunctional products. For example, compounds having four carboxylic acid groups, or four hydroxy groups, or two hydroxy and two carboxylic acid groups can be prepared. Thus, representing parts of various polyester molecules as follows with possible crosslinkages illustrated by the dotted lines, possible products obtained upon hydrolysis or saponification can be illustrated:

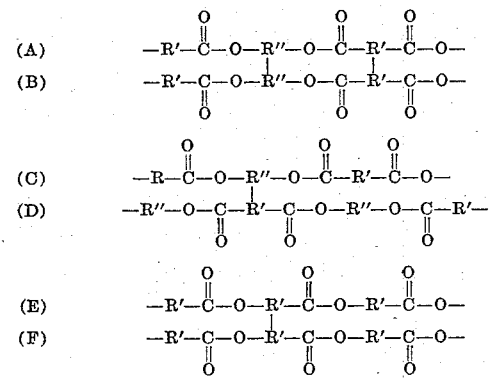

In A and B, both representing segments of two polyester molecules in which R' and R'' are divalent hydrocarbon groups. Where the two molecules are crosslinked through the R'' groups, hydrolysis will produce a tetrahydroxy compound. Similarly, where the crosslinkage is through the R' groups, hydrolysis will produce a tetracarboxylic acid compound.

With polymer segments C and D where the crosslinkage is shown between an R' and an R'' group, the product upon hydrolysis is a dihydroxydicarboxylic acid.

With polymer segments E and F representing parts of a polyester made from an hydroxycarboxylic acid, the hydrolysis product would be a dihydroxydicarboxylic acid.

Therefore it can be seen that the foregoing permits the production of various polyfunctional hydroxy and carboxylic acid compounds. This is surprising and especially important in view of the fact that when the corresponding monomeric hydroxy and carboxylic acid compounds are irradiated directly, the monomers generally decompose and do not give the polyfunctional derivatives illustrated above. It is not intended, however, that the invention be restricted to the specific type of products or linkages or theories indicated above. It is contemplated that the invention covers whatever products are obtained by the practice taught herein regardless of the exact chemical structure. The foregoing is merely illustrative of the possibilities of the invention.

The hydrolysis can be carried out on any of the irradiated resins produced according to any of the foregoing examples. A suitable procedure is illustrated by the following example.

*Example XVIII*

Potassium hydroxide is dissolved in alcohol—the amount of KOH being slightly in excess of the stoichiometric amount calculated on the basis of the amount of resin to be hydrolyzed. The resin and the alcoholic solution are placed in equipment provided with stirrer and reflux condenser. The mixture is stirred and refluxed for about half an hour after the resin has gone into solution. The resultant solution contains the polyhydroxy derivatives and the potassium salt of the carboxylic acids. The solution can be concentrated by distilling off some of the alcohol and the hydroxy and carboxylic acid derivatives separated by various means such as neutralization, distillation, crystallization, extraction, etc.

*Example XIX*

When the irradiated resins of Examples II, III, and IV and V are hydrolyzed by the procedure of the preceding example and sufficient hydrochloric acid added in each case to react with the potassium present in the product, followed by atmospheric distillation of the volatile materials present and subsequent distillation at reduced pressure, distillates of wide boiling range are obtained. Various fractions of these distillates give tests indicating the presence of hydroxy and carboxylic acid groups.

The compositions produced according to the preceding two examples are particularly useful in the preparation of modified drying oil compositions. As indicated previously herein the irradiated polyesters produced by the invention disclosed herein, including those containing various modifiers as described, are useful in the production of fibers, films, coatings and other shaped articles of improved properties such as improved heat and solvent resistance.

The invention claimed is:

1. A process for producing polyester resin compositions having improved heat resistance comprising the treatment of a composition consisting of a linear, saturated aliphatic polyester of at least 4,000 molecular weight with at least about 5 megareps of irradiation using an energy source of at least about 100,000 electron volts, said polyester having ester groups in the linear chain thereof.

2. A process of claim 1 in which the polyester is a polyalkylene polyaliphatic dicarboxylate.

3. A process according to claim 2 in which the irradiated product is hydrolyzed.

4. A process of claim 1 in which the polyester is a polymeric hydroxy aliphatic carboxylic acid.

5. A process according to the process of claim 4 in which the irradiated product is hydrolyzed.

6. A process of claim 1 in which said polyester is a polyalkylene polysebacate.

7. A process of claim 1 in which said polyester is a polyalkylene polyadipate.

8. A process of claim 1 in which said polyester is a polyalkylene polyazelate.

9. A process of claim 1 in which said polyester is a polyethylene polysebacate.

10. A process of claim 1 in which said polyester is a poly(trimethylene) polyadipate.

11. A process of claim 1 in which said polyester is a polyethylene polyazelate.

References Cited in the file of this patent

Modern Plastics, vol. 32 (September 1954), No. 1, pages 141–144, 146 and 148.

UNITED STATES PATENT OFFICE
CERTIFICATION OF CORRECTION

Patent No. 2,951,024                                              August 30, 1960

Gaetano F. D'Alelio

It is hereby certified that error appears in the above numbered patent requiring correction and that the said Letters Patent should read as corrected below.

Column 7, lines 34 to 49, the formulas should appear as shown below instead of as in the patent:

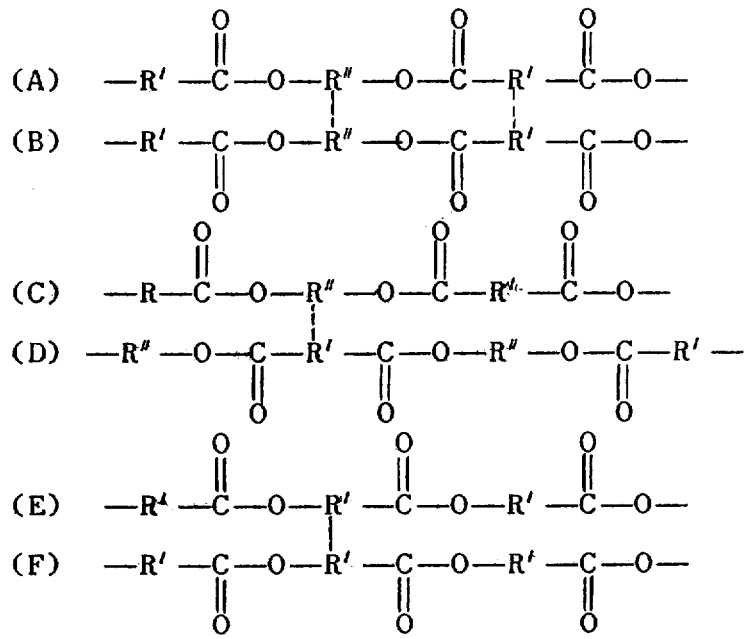

same column 7, line 52, for "groups." read -- groups: --.

Signed and sealed this 23rd day of May 1961.

(SEAL)
Attest:

ERNEST W. SWIDER                                        DAVID L. LADD
Attesting Officer                                     Commissioner of Patents